(12) United States Patent
McCorkendale

(10) Patent No.: US 8,503,636 B1
(45) Date of Patent: Aug. 6, 2013

(54) SYSTEMS AND METHODS FOR BLOCKING AN OUTGOING REQUEST ASSOCIATED WITH AN OUTGOING TELEPHONE NUMBER

(75) Inventor: Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 132 days.

(21) Appl. No.: 13/097,670

(22) Filed: Apr. 29, 2011

(51) Int. Cl.
H04M 15/00 (2006.01)
H04M 17/00 (2006.01)
H04M 3/42 (2006.01)

(52) U.S. Cl.
USPC ....... 379/134; 379/133; 379/145; 379/210.02

(58) Field of Classification Search
USPC ............... 379/93.02, 100.05, 114.14, 142.05, 379/142.06, 145, 196, 201.01, 201.02, 201.08, 379/133, 134; 726/22, 26–30
See application file for complete search history.

(56) References Cited

U.S. PATENT DOCUMENTS

| | | | | |
|---|---|---|---|---|
| 5,809,493 | A * | 9/1998 | Ahamed et al. | 706/52 |
| 8,238,532 | B1 * | 8/2012 | Cox et al. | 379/114.14 |
| 2004/0170258 | A1 * | 9/2004 | Levin et al. | 379/88.01 |
| 2005/0203747 | A1 * | 9/2005 | Lecoeuche | 704/270.1 |
| 2006/0026680 | A1 * | 2/2006 | Zakas | 726/22 |
| 2008/0080691 | A1 * | 4/2008 | Dolan et al. | 379/201.01 |
| 2011/0211682 | A1 * | 9/2011 | Singh et al. | 379/142.05 |

OTHER PUBLICATIONS

Website: http://usa.kasperksy.com/products-services/home-computer-security/mobile-security, Kasperksy Mobile Security 9, Apr. 6, 2011 (2 pgs.).
Website: http://kaspersky.com/support/mobile/kms9wm/parental, Kasperksy Mobile Security 9.0 (for Windows Mobile 5.0/6.0/6.1/6.1), Setting Parental Control, Apr. 29, 2011 (1 pg.).

* cited by examiner

Primary Examiner — Binh Tieu
(74) Attorney, Agent, or Firm — Holland & Hart LLP (57) ABSTRACT

A computer-implemented method to block an outgoing request associated with an outgoing telephone number is described. A device is monitored for an outgoing request associated with an outgoing telephone number. The outgoing request is intercepted. The outgoing telephone number associated with the outgoing request is extracted. Upon determining that the extracted outgoing telephone number matches a telephone number stored in a database, the outgoing request is blocked.

18 Claims, 8 Drawing Sheets

SYSTEMS AND METHODS FOR BLOCKING AN OUTGOING REQUEST ASSOCIATED WITH AN OUTGOING TELEPHONE NUMBER

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

Some types of computing systems may have the capability to engage in an active telephone call. For example, certain telephones may be considered to be computing systems. In addition, traditional computing systems may engage in an active telephone call with another computing system. In some cases, a computing system may initiate a telephone call by dialing a phone number associated with another entity. Computing systems may also receive a telephone call initiated by another entity. The entity communicating with the user of the computing system, however, may be a malicious entity posing as a legitimate entity. The malicious entity may solicit sensitive information from the user during the telephone call. Upon receipt of this sensitive information, the malicious entity may cause financial, emotional, and other types of harm to the user participating on the call.

SUMMARY

According to at least one embodiment, a computer-implemented method to block an outgoing request associated with an outgoing telephone number is described. A device is monitored for an outgoing request associated with an outgoing telephone number. The outgoing request is intercepted. The outgoing telephone number associated with the outgoing request is extracted. Upon determining that the extracted outgoing telephone number matches a telephone number stored in a database, the outgoing request is blocked.

In one embodiment, the extracted outgoing telephone number may be transmitted to a back-end server. Data may be received from the back-end server that indicates that the extracted outgoing telephone number matches a telephone number stored in a database. In one example, a confidence rating may be assigned to a telephone number stored in the database. The confidence rating may indicate a level of confidence that the telephone number is associated with a malicious entity.

At least one source may be monitored for a telephone number. A telephone number may be identified from the source. A determination may be made as to whether the identified telephone number is stored in the database. Upon determining that the identified telephone number is not stored in the database, the identified telephone number may be added to the database. In one configuration, a notification message may be generated that notifies a recipient that the outgoing request is blocked.

A computing device configured to block an outgoing request associated with an outgoing telephone number is also described. The computing device may include a processor and memory in electronic communication with the processor. The computing device may further include a protection module configured to monitor the computing device for an outgoing request associated with an outgoing telephone number, and intercept the outgoing request. The protection module may be further configured to extract the outgoing telephone number associated with the outgoing request. Upon determining that the extracted outgoing telephone number matches a telephone number stored in a database, the protection module may be configured to block the outgoing request.

A computer-program product for blocking an outgoing request associated with an outgoing telephone number is also described. The computer-program product may include a non-transitory computer-readable medium having instructions thereon. The instructions may include code programmed to monitor the computing device for an outgoing request associated with an outgoing telephone number, and code programmed to intercept the outgoing request. The instructions may further include code programmed to extract the outgoing telephone number associated with the outgoing request. Upon determining that the extracted outgoing telephone number matches a telephone number stored in a database, the instructions may also include code programmed to block the outgoing request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Phishing is a technique used by malicious entities to attempt to acquire sensitive information from unsuspecting persons. The sensitive information may include, but is not limited to, usernames, passwords, credit card details, bank account information, and the like. Using this technique, malicious entities masquerade as trustworthy entities in an electronic communication. Communications purporting to be from popular social websites, auction sites, online payment processors, information technology (IT) administrators, etc. may be used to lure the unsuspecting public. In one example, phishing may be carried out by e-mail or instant messaging communications. Phishing attempts may direct users to enter sensitive information at an illegitimate website whose look and feel are almost identical to a legitimate website.

Phishing and other socially engineered scams are causing serious financial and emotional damage to both vulnerable individuals and companies. Anti-malware and anti-spam technologies may protect computing and e-mail environments from executing or receiving harmful content. Users, nonetheless, may still fall prey to a scam. For example, a malicious entity may provide a message to a user that claims to be a message from a trustworthy entity. The message may be provided via electronic communications (e.g., e-mail, instant message, website, and the like) or the message may be provided via non-electronic communications (e.g., postal mail, parking ticket, flyer, poster, and the like). The message may instruct the user to dial or otherwise input a particular telephone number. The user may input the telephone number believing that the telephone number is associated with the trustworthy entity. The telephone number, however, my be associated with the malicious entity. Once the user opens a communications channel with the malicious entity via the telephone number, the user may be instructed to provide sensitive information over the communications channel. As a result, the malicious entity may collect the sensitive information and use it to harm the user (e.g., financial harm, theft of identity, and the like). In one embodiment, the present systems and methods provide a proactive mechanism to prevent incoming requests from or outgoing requests to telephone numbers known to be associated with malicious entities.

The present systems and methods may track and analyze fraud perpetrated by phishing and related scams. These scams may exist in various forms (e.g., email, instant messaging, ad-ware/spy-ware, fake anti-virus (AV) programs, fraudulent websites, non-electronic communication sources, and the like). Telephone numbers associated with these scams may be extracted from the various forms used by the scam. The present systems and methods may intercept incoming and/or outgoing requests associated with a telephone number to establish a communications channel, compare the telephone number with telephone numbers stored in a database of telephone numbers associated with known frauds and scams. If there is a match, the present systems and methods may prevent the ingoing and/or outgoing request from establishing a communications channel. The database of fraud-related telephone numbers may be regularly updated.

In one example, the present systems and methods may block or prevent outgoing call requests to telephone numbers that match telephone numbers stored in the database. In one configuration, the present systems and methods may block outgoing call requests originating on mobile smart phones using application programming interfaces (APIs) from mobile platforms such as, but not limited to, Android, iOS, and Windows Mobile. In one embodiment, the present systems and methods may be implemented within a carrier network infrastructure, within a Voice over Internet Protocol (VoIP) system, as an appliance in front of a land-line, or other infrastructure. For example, the present systems and methods may be built as a service within (or on top of) the Google Voice infrastructure.

In addition to existing sources of information (e.g., ad-ware, spy-ware, fake (AV), malware, email streams, sensors in endpoint products monitoring suspicious activity/websites, web-crawlers, researcher analysis, and the like), the present system and methods may access law enforcement advisories about scams being disseminated through physical mail, flyer postings, fake parking tickets, fake lottery tickets, con artist materials, and similar sources of information to extract information for analysis and storage in the database.

Figure 1:
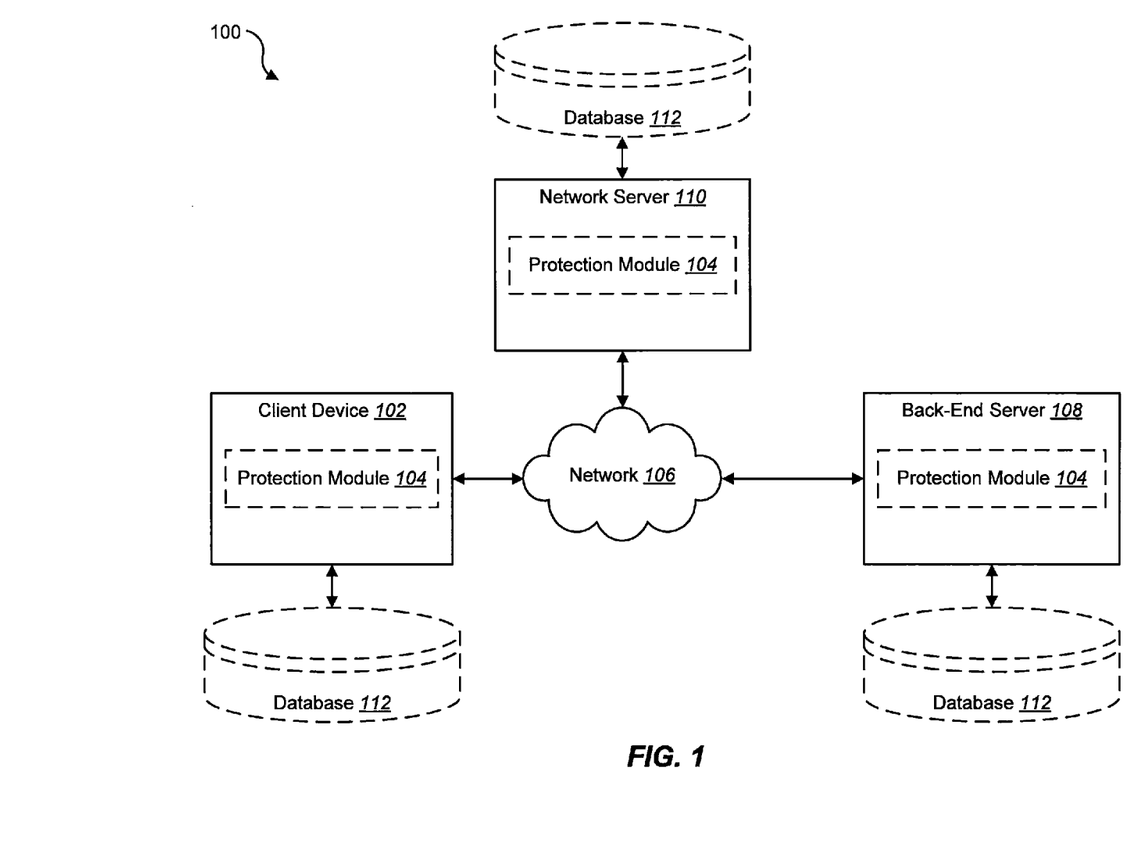
FIG. 1 is a block diagram illustrating one embodiment of an environment in which the present systems and methods may be implemented.

FIG. 1 is a block diagram illustrating one embodiment of an environment 100 in which the present systems and methods may be implemented. In one example, a client device 102 may communicate with a network server 110 and a back-end server 108 across a network 106. The client device 102 may be a computing device, such as, but not limited to, a mobile communications device, a smart phone, a personal computer, a tablet, a laptop, a personal digital assistant (PDA), and the like. The network server 110 may be part of the infrastructure of a carrier network that provides telecommunications services to various subscribers. The back-end server 108 may be part of the infrastructure of an entity that may implement the present systems and methods (or a portion thereof).

In one configuration, the client device 102, the network server 110, and/or the back-end server 108 may include a protection module 104. As will be discussed in more detail below, the protection module 104 may analyze various sources to extract certain information (e.g., a telephone number) from the sources. The extracted information may be compared with information previously stored in a database 112. In one embodiment, the protection module 104 may prevent or block certain activities of the client device 102 depending on the results of the comparison.

Figure 2:
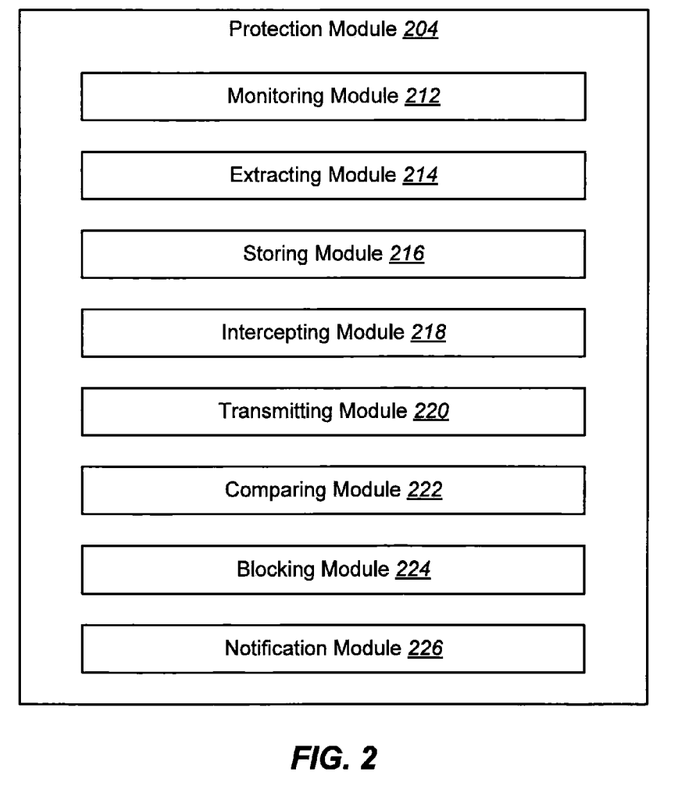
FIG. 2 is a block diagram illustrating one embodiment of a protection module in accordance with the present systems and methods.

FIG. 2 is a block diagram illustrating one embodiment of a protection module 204 in accordance with the present systems and methods. The module 204 may include a monitoring module 212, an extracting module 214, a storing module 216, an intercepting module 218, a transmitting module 220, a comparing module 222, a blocking module 224, and a notification module 226. In one configuration, the client device 102, the network server 110, and the back-end server 108 may include all, a portion, or any combination of the modules included in the protection module 204.

In one example, the monitoring module 212 may monitor one or more sources. Examples of sources that the monitoring module 212 may monitor may include, but are not limited to, ad-ware, spy-ware, fake (AV), malware, email streams, websites, electronic law enforcement advisories regarding scams being disseminated through physical mail, flyer postings, fake parking tickets, fake lottery tickets, con artist materials, and similar sources of information. The monitoring module 212 may also monitor sources that may be manually uploaded to a system by a user. For example, a user may manually input information regarding a known scam (such as a parking ticket scam). The monitoring module 212 may monitor the information manually inputted by the user.

In one configuration, the extracting module 214 may extract information from the monitored sources. In one example, the extracting module 214 may analyze the information to identify information that satisfies a particular format. For example, the extracting module 214 may analyze information to identify information that is the format of a telephone number. When information is identified that satisfies the particular format, the extracting module 214 may copy the information and the storing module 216 may determine whether the information is already stored in a database 112. If the information is not already stored in the database 112, the storing module 216 may store the copy of the information in the database 112.

In one embodiment, the intercepting module 218 may intercept incoming and/or outgoing requests to/from the client device 102. In one example, the requests may be call requests to establish a communications channel between the client device 102 and another device. For example, an outgoing call request may be made by a user dialing a telephone number on the client device 102. The incoming and/or outgoing request may be a request to establish a voice communications channel, a video communications channel, a data communications channel, and the like. For example, a user may initiate an outgoing request by inputting a telephone number to establish a voice chat session, a video chat session, send a short message service (SMS) message, a multimedia messaging service (MMS) message, an Internet call, and the like. The intercepting module 218 may intercept such incoming and/or outgoing requests before a communications channel is established.

In one example, the transmitting module 220 may transmit information associated with the incoming and/or outgoing request. For example, the transmitting module 220 may transmit a telephone number associated with the request. If the intercepting module 218 intercepts an incoming call request originating from a telephone number, the transmitting module 220 may transmit that telephone number to a back-end server 108 for analysis. Similarly, if the intercepting module 218 intercepts an outgoing call request originating at the client device 102 with a user inputting a telephone number, the transmitting module 220 may transmit that telephone number to the back-end server 108 for analysis. In one configuration, the telephone number associated with a request may not be transmitted. Instead, the intercepting module 218 may intercept the request and the client device 102 may analyze the information the telephone number associated with the request, without transmitting the telephone number to the back-end server 108 for analysis.

In one embodiment, the comparing module 222 may compare information associated with a request with information stored in the database 112. In one configuration, the comparing module 222 may compare a telephone number associated with a request with telephone numbers previously stored in the database 112. For example, the intercepting module 218 may intercept an outgoing call request when a user inputs (or otherwise accesses) a telephone number. The comparing module 222 may compare the inputted telephone number to the database 112 that stores one or more telephone numbers. The blocking module 224 may block or prevent the request if the comparing module 222 determines that a match has occurred. In other words, if the user dials a telephone number to establish an outgoing call, and the telephone number has been previously stored in the database 112, the blocking module 224 may prevent the outgoing call from being completed. The blocking module 224 may block incoming requests as well if the telephone number originating the incoming request matches a telephone number previously stored in the database 112. The blocking module 224 may block requests to establish voice communications, data communications, video communications, Internet calls, and the like. The blocking module 224 may also block requests to send/receive SMS messages, MMS messages, and the like.

The notification module 226 may generate a notification message 226 when the blocking module 224 blocks a request. The notification message may be transmitted (via the transmitting module 220) to a specified entity. For example, the notification message may be transmitted to a user of the client device 102. The message may be transmitted to an administrator of the client device 102. Further, the notification message may be transmitted to a guardian, parent, etc. of an individual using the client device 102. The recipient of the notification message may be provided the option to override the blocking module 224 and allow the request (incoming and/or outgoing) to be carried out. In other words, if the blocking module 224 blocks an outgoing call request to a particular telephone number that matches a telephone number stored in the database 112, the recipient of the notification message may override the blocking of the request and allow the outgoing call request to be executed. The notification message may be transmitted via any number of communications means, such as, but not limited to, email, SMS message, telephone call, instant message, and the like.

Figure 3:
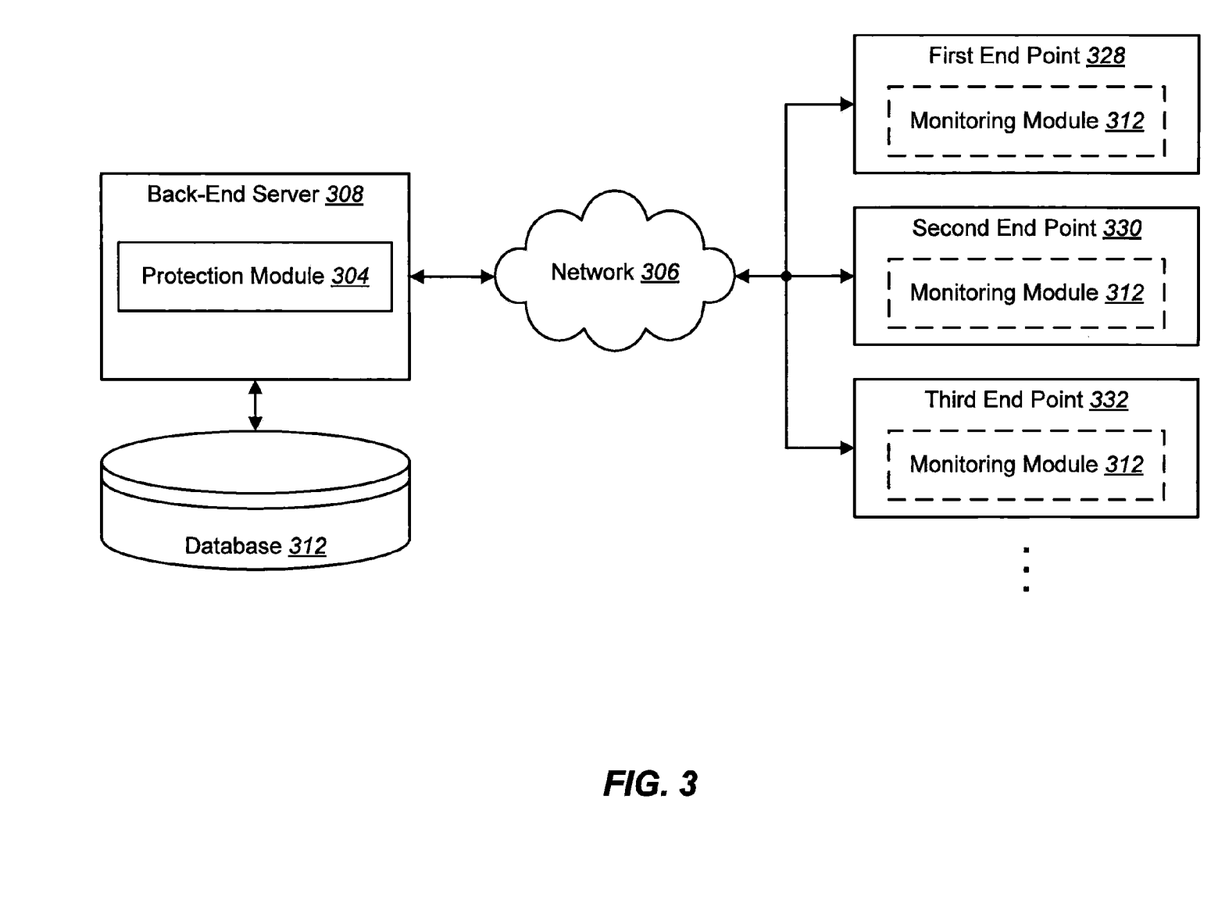
FIG. 3 is a block diagram illustrating one embodiment of an environment in which information may be gathered to populate a database.

FIG. 3 is a block diagram illustrating one embodiment of an environment in which information may be gathered to populate a database 312. In one configuration, a back-end server 308 may include a protection module 304. The server 308 may communicate with one or more end points 328, 330, 332 across a network 306 connection. Each end point 328, 330, 332 may include some or all of the various modules of the protection module 304, described above. For example, one or more of the end points 328, 330, 332 may include a monitoring module 312. The various end points 328, 330, 332 may be, but are not limited to, client devices 102, as previously described. The monitoring module 312 may monitor various sources to extract information. For example, the monitoring module 312 may monitor ad-ware, spy-ware, fake AV, malware, email streams, suspicious activities, websites, law enforcement advisories about scams being disseminated through physical mail, flyer postings, fake parking tickets, fake lottery tickets, con artist materials, and similar sources of information. Information from these various sources may be extracted (either by an extracting module 214 on an end point 328, 330, 332 or by an extracting module 214 on the back-end server 308) and stored in the database 312. An example of information that may be extracted from the various sources that are monitored may include a telephone number. As a result, the database 312 may be dynamically populated with telephone numbers associated with various sources being monitored by various end points 328, 330, 332. The database 312 may be constantly updated with telephone numbers based on the monitoring of sources (and the extraction of telephone numbers from those sources) being performed by multiple end points 328, 330, 332 and the back-end server 308.

Figure 4:
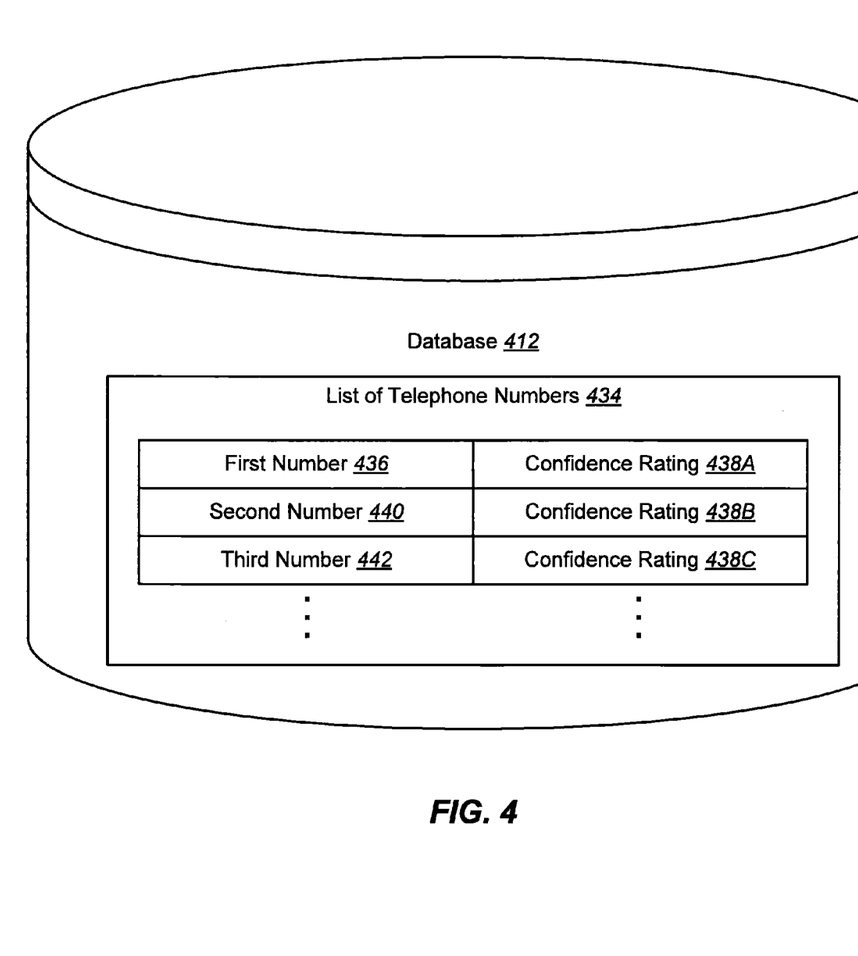
FIG. 4 is a block diagram illustrating one embodiment of a database in accordance with the present systems and methods.

FIG. 4 is a block diagram illustrating one embodiment of a database 412 in accordance with the present systems and methods. The database 412 may include a list of telephone numbers 434. The list 434 may include a first telephone number 436, a second telephone number 440, and a third telephone number 442. While only three telephone numbers 436, 440, 442 are included in the database 412, it is to be understood that more or less than three telephone numbers may be stored in the database 412.

In one configuration, a confidence rating 438 may be associated with each telephone number 436, 440, 442 stored in the database 412. The confidence rating 438 may be numerical rating, a percentage, or other type of rating that indicates a confidence level that a particular telephone number is associated with a malicious entity, a scam, fraudulent activity, a phishing attempt, etc. For example, the first telephone number 436 may be associated with a confidence rating 438A. The confidence rating 438A may be 90%, which may signify that there is a 90% chance that the first telephone number 436 is indeed associated with a malicious entity. Similarly, a confidence rating 438B associated with the second telephone number 440 may be 40%, which may signify that there is a 40% chance that the second telephone number 440 is associated with a malicious entity.

The confidence rating assigned to a telephone number may be dynamic. In other words, the confidence rating for a particular telephone number may be updated. For example, a user may supply feedback relating to a particular telephone number. The feedback may indicate that a telephone number with a high level of confidence of being associated with a malicious entity is not actually associated with a malicious entity. As a result, the confidence rating that this telephone number is associated with a malicious entity may be lowered. Similarly, the user may supply feedback that indicates that a particular telephone number is associated with a malicious entity. The currently assigned confidence rating for this telephone number may be increased to more adequately represent a high confidence level that the telephone number is associated with a malicious entity.

In one embodiment, the blocking module 224 may block requests that are associated with telephone numbers that are assigned a confidence rating that satisfies a particular threshold. For example, the comparing module 222 may determine that a telephone number associated with an outgoing call request matches a telephone number stored in the database 412. The telephone number stored in the database 412 is assigned a certain confidence rating 438 that satisfies the threshold. As a result, the blocking module 224 may proceed to block the outgoing call request. If, however, the confidence rating 438 does not satisfy the threshold, the blocking module 224 may not block the outgoing call request. In one example, the notification module 226 may generate a notification message indicating that the telephone number associated with the outgoing call request has a particular confidence rating. Even though the blocking module 224 may not automatically block the outgoing call request, the recipient of the notification message may at least become aware that the telephone number matched a telephone number stored in the database 412. The recipient may then (via the blocking module 224) block or prevent the outgoing call request from being carried out.

Figure 5:
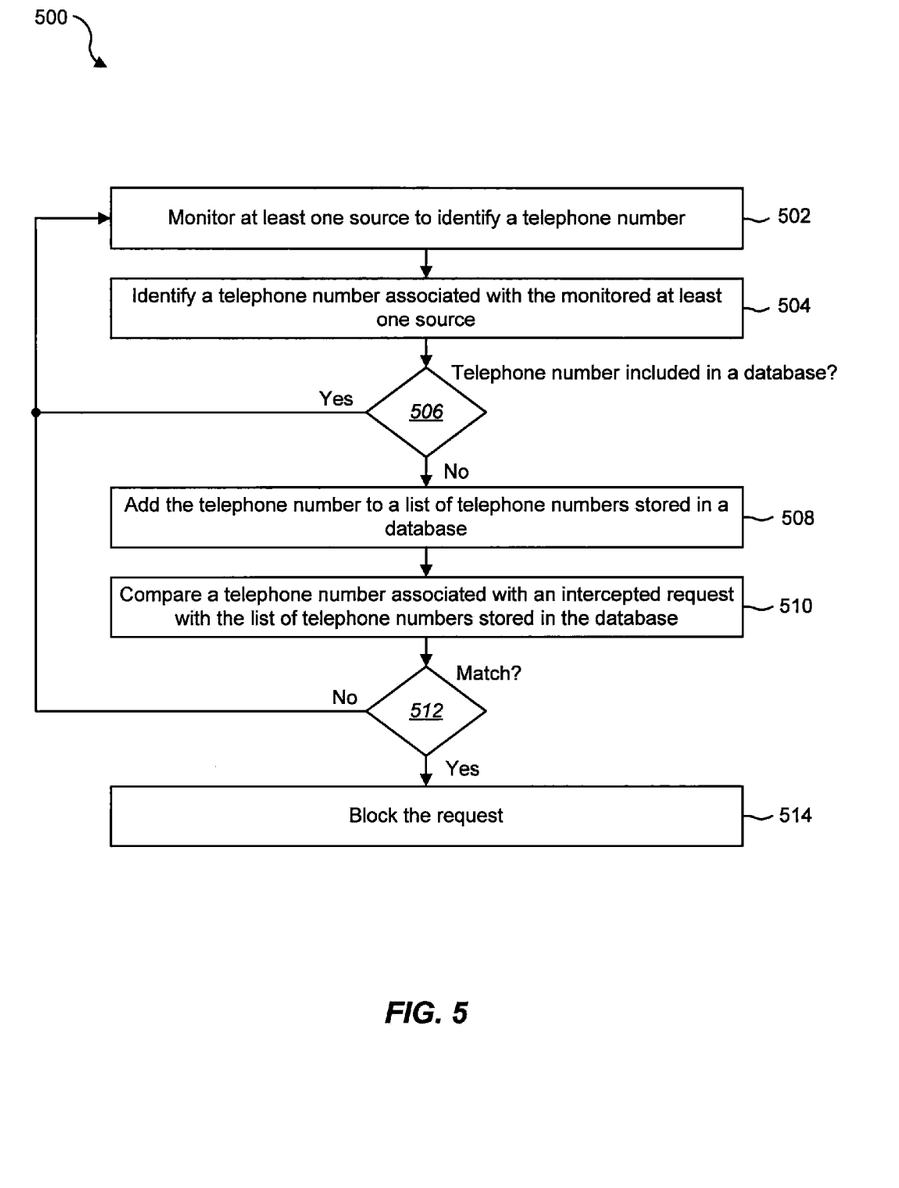
FIG. 5 is a flow diagram illustrating one embodiment of a method to block a call request based on the results of a comparison of information associated with the call request to information stored in a database.

FIG. 5 is a flow diagram illustrating one embodiment of a method 500 to block a call request based on the results of a comparison of information associated with the call request to information stored in a database. In one configuration, the method 500 may be implemented by the protection module 104.

In one embodiment, at least one source may be monitored 502 to identify a telephone number. A telephone number associated with the at least one monitored source may be identified 504. A determination 506 may be made as to whether the identified telephone number is included in a database. If it is determined 506 that the identified telephone number is included in the database, the method 500 may return to monitor at least one source. If, however, it is determined 506 that the telephone number is not included in the database, the telephone number may be added 508 to a list of telephone numbers stored in the database.

In one example, a telephone number associated with an intercepted request may be compared 510 with telephone numbers included in the list of telephone numbers stored in the database. A determination 512 may be made as to whether there is a match. If it is determined 512 that there is not a match, the method 500 may return to monitor at least one source. If, however, it is determined 512 that there is a match, the request may be blocked 514.

Figure 6:
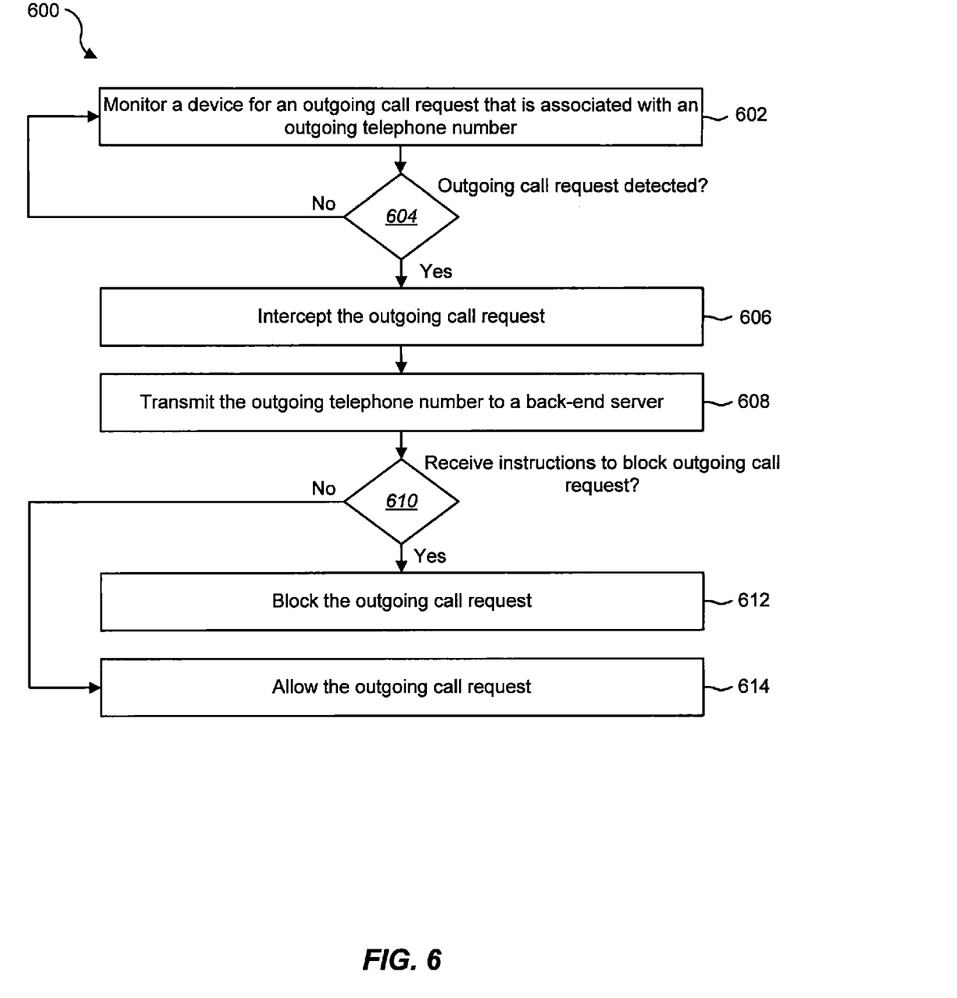
FIG. 6 is a flow diagram illustrating one embodiment of a method to block outgoing call requests to telephone numbers associated with malicious entities.

FIG. 6 is a flow diagram illustrating one embodiment of a method 600 to block outgoing call requests to telephone numbers associated with malicious entities. In one configuration, the method 600 may be implemented by the protection module 104.

In one example, a device may be monitored 602 for an outgoing call request that is associated with an outgoing telephone number. A determination 604 may be made as to whether an outgoing call request has been detected. If it is determined 604 that an outgoing call request has not been detected, the method 600 may return to monitor 602 a device for an outgoing call request. If, however, it is determined 604 that an outgoing call request has been detected, the outgoing call request may be intercepted 606. In one configuration, the outgoing telephone number associated with the request may be extracted and transmitted 608 to a back-end server 108 for analysis. A determination 610 may be made as to whether instructions have been received to block the outgoing call request. For example, the back-end server 108 may compare the received outgoing telephone number and compare the number to telephone numbers stored in a database 112. If there is a match, the back-end server 108 may transmit instructions to block the outgoing call request. In on example, if instructions are received, the outgoing call request may be blocked 612. If, however, it is determined 610 that instructions to block the outgoing call request are not received, the outgoing call request may be allowed 614 to be carried out.

Figure 7:
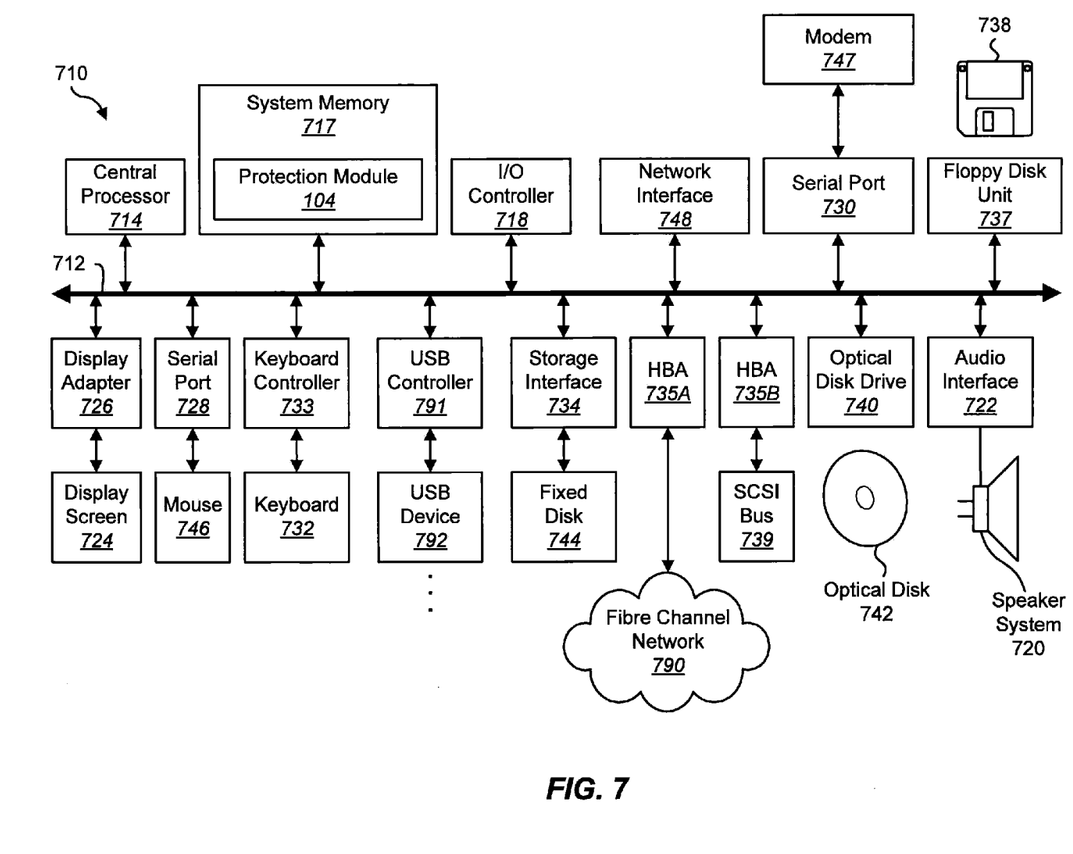
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 791), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the protection module 104 to implement the present systems and methods may be stored within the system memory 717. Applications resident with computer system 710 are generally stored on and accessed via a non-transitory computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
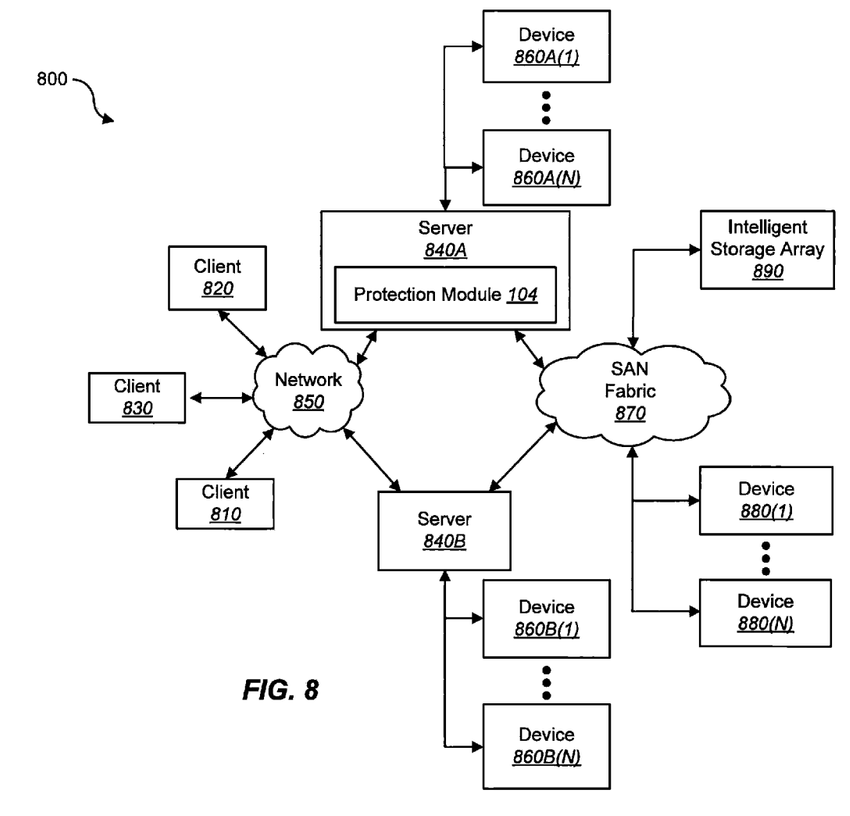
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A, 840B (any of which can be implemented using computer system 810), are coupled to a network 850. In one embodiment, the protection module 104 may be located within the storage servers 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A, 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to block an outgoing request associated with an outgoing telephone number, comprising:
   monitoring, by a processor, a device for an outgoing request associated with an outgoing telephone number;
   intercepting, by the processor, the outgoing request;
   extracting, by the processor, the outgoing telephone number associated with the outgoing request;
   upon determining that the extracted outgoing telephone number matches a telephone number stored in a database, blocking, by the processor, the outgoing request;
   assigning a confidence rating to a telephone number stored in the database; and
   upon determining the confidence rating satisfies a predetermined threshold, blocking the outgoing request based on the confidence rating.

2. The method of claim 1, further comprising transmitting the extracted outgoing telephone number to a back-end server.

3. The method of claim 2, further comprising receiving data from the back-end server that indicates that the extracted outgoing telephone number matches a telephone number stored in a database.

4. The method of claim 1, wherein the confidence rating indicates a level of confidence that the telephone number is associated with a malicious entity.

5. The method of claim 1, further comprising monitoring at least one source for a telephone number.

6. The method of claim 5, further comprising identifying a telephone number from the source and determining whether the identified telephone number is stored in the database.

7. The method of claim 6, upon determining that the identified telephone number is not stored in the database, further comprising adding the identified telephone number to the database.

8. The method of claim 1, further comprising generating a notification message that notifies a recipient that the outgoing request is blocked.

9. A computing device configured to block an outgoing request associated with an outgoing telephone number, comprising:
   a processor;
   memory in electronic communication with the processor;
   instructions stored in the memory, the instructions being executable by the processor to:
      monitor the computing device for an outgoing request associated with an outgoing telephone number;
      intercept the outgoing request;
      extract the outgoing telephone number associated with the outgoing request;
      upon determining that the extracted outgoing telephone number matches a telephone number stored in a database, block the outgoing request;
      assign a confidence rating to a telephone number stored in the database; and
      upon determining the confidence rating satisfies a predetermined threshold, block the outgoing request based on the confidence rating.

10. The computing device of claim 9, wherein the instruction are executable by the processor to:
    transmit the extracted outgoing telephone number to a back-end server.

11. The computing device of claim 10, wherein the instruction are executable by the processor to:
    receive data from the back-end server that indicates that the extracted outgoing telephone number matches a telephone number stored in a database.

12. The computing device of claim 9, wherein the confidence rating indicates a level of confidence that the telephone number is associated with a malicious entity.

13. The computing device of claim 9, wherein the instruction are executable by the processor to:
    monitor at least one source for a telephone number.

14. The computing device of claim 13, wherein the instruction are executable by the processor to:
    identify a telephone number from the source and determine whether the identified telephone number is stored in the database.

15. The computing device of claim 14, wherein upon determining that the identified telephone number is not stored in the database, the instruction are executable by the processor to:
    add the identified telephone number to the database.

16. The computing device of claim 9, wherein the instruction are further executable by the processor to:
    generate a notification message that notifies a recipient that the outgoing request is blocked.

17. A computer-program product for blocking an outgoing request associated with an outgoing telephone number, the computer-program product comprising a non-transitory computer-readable medium having instructions thereon, the instructions being executable by a processor to:
    monitor a computing device for an outgoing request associated with an outgoing telephone number;
    intercept the outgoing request;
    extract the outgoing telephone number associated with the outgoing request;
    upon determining that the extracted outgoing telephone number matches a telephone number stored in a database, block the outgoing request;
    assign a confidence rating to a telephone number stored in the database; and
    upon determining the confidence rating satisfies a predetermined threshold, block the outgoing request based on the confidence rating.

18. The computer-program product of claim 17, wherein the instruction are executable by the processor to:
    transmit the extracted outgoing telephone number to a back-end server for analysis.

* * * * *